(12) United States Patent
Reis et al.

(10) Patent No.: US 9,201,262 B2
(45) Date of Patent: Dec. 1, 2015

(54) DISPLAY DEVICE WITH THERMAL LINK

(75) Inventors: Bradley E. Reis, Westlake, OH (US); Robert Anderson Reynolds, III, Bay Village, OH (US); Yin Xiong, Westlake, OH (US); G M Fazley Elahee, Westlake, OH (US); Seung Yong Lee, Superior Township, MI (US); Gregory P. Kramer, Lyndhurst, OH (US)

(73) Assignee: GrafTech International Holdings Inc., Independence, OH (US)

( * ) Notice: Subject to any disclaimer, the term of this patent is extended or adjusted under 35 U.S.C. 154(b) by 692 days.

(21) Appl. No.: 13/452,698

(22) Filed: Apr. 20, 2012

(65) Prior Publication Data

US 2013/0278863 A1    Oct. 24, 2013

(51) Int. Cl.
*G02F 1/1333*    (2006.01)

(52) U.S. Cl.
CPC .... *G02F 1/133385* (2013.01); *G02F 1/133382* (2013.01); *G02F 2001/133314* (2013.01); *G02F 2001/133317* (2013.01)

(58) Field of Classification Search
CPC ............ G02F 1/133382; G02F 1/133385; G02F 2001/133314; G02F 2001/133317
USPC ........................................................ 349/161
See application file for complete search history.

(56) References Cited

U.S. PATENT DOCUMENTS

| 6,482,520 | B1 | 11/2002 | Tzeng |
| 7,889,502 | B1 | 2/2011 | Reis et al. |
| 2004/0201877 | A1* | 10/2004 | Fujimori et al. ............... 359/245 |
| 2006/0171124 | A1 | 8/2006 | Capp et al. |
| 2008/0085389 | A1 | 4/2008 | Norley et al. |
| 2008/0151502 | A1 | 6/2008 | Shives et al. |
| 2010/0141561 | A1 | 6/2010 | Han et al. |
| 2011/0069252 | A1* | 3/2011 | Cho et al. ......................... 349/62 |
| 2011/0085107 | A1 | 4/2011 | Noh et al. |
| 2011/0134106 | A1 | 6/2011 | Reis et al. |
| 2011/0170017 | A1 | 7/2011 | Liu |
| 2012/0044650 | A1 | 2/2012 | Kim et al. |

FOREIGN PATENT DOCUMENTS

| EP | 1754993 | 12/2008 |
| JP | 2003-279954 | 10/2003 |
| KR | 10-2007-0076052 | 7/2007 |

OTHER PUBLICATIONS

International Search Report for PCT/US12/34560 issued by the USPTO as International Search Authority on Jul. 30, 2012.

* cited by examiner

*Primary Examiner* — Dennis Y Kim
(74) *Attorney, Agent, or Firm* — Rankin, Hill & Clark LLP

(57) ABSTRACT

A display device includes a heat sink and an LCD panel having peripheral edges. The LCD panel includes a non-activated area extending inwardly a predetermined distance from the peripheral edges. A thermal link is provided, made from an anisotropic graphite material, and is in thermal contact with the heat sink and with at least a portion of the non-activated area of said LCD panel.

9 Claims, 4 Drawing Sheets

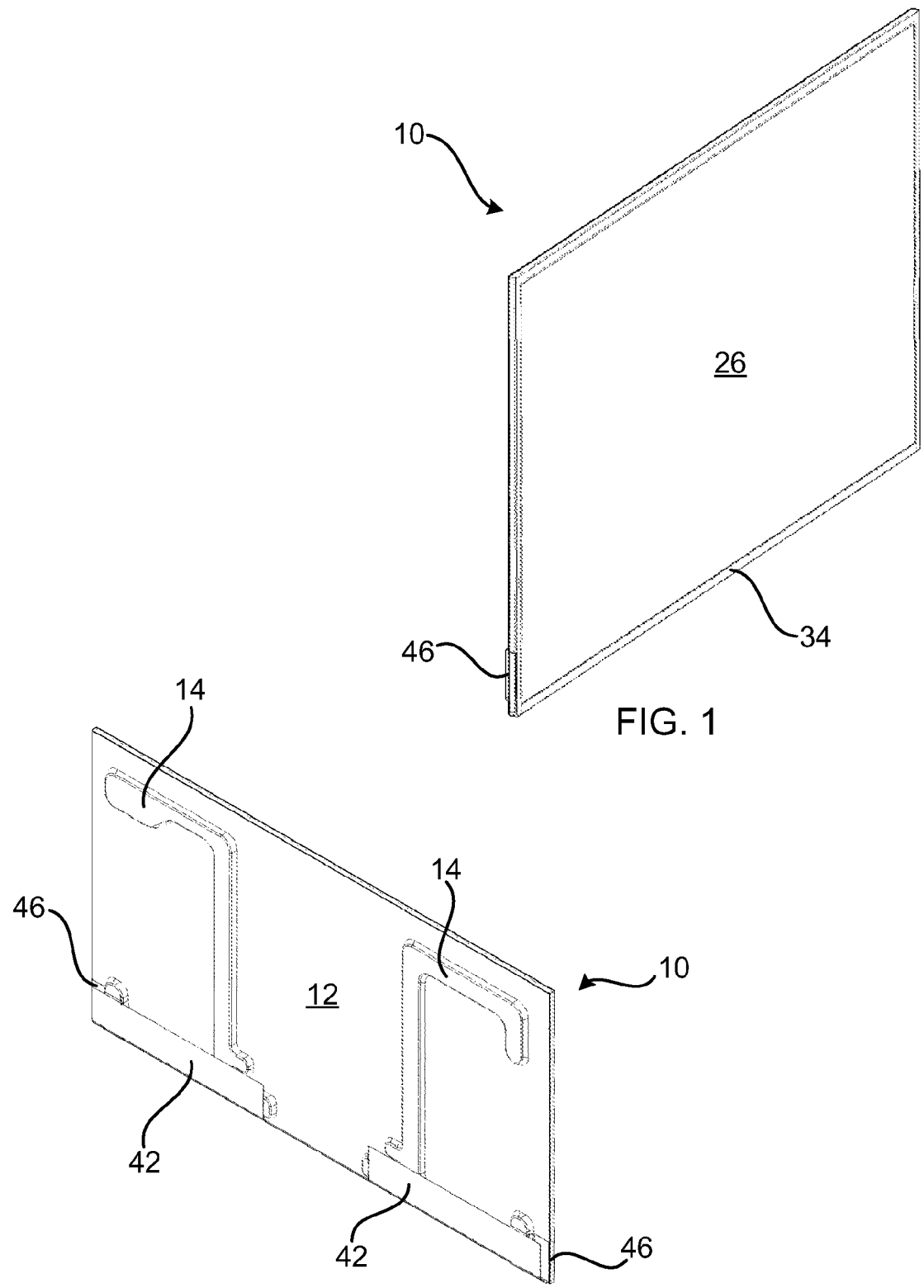

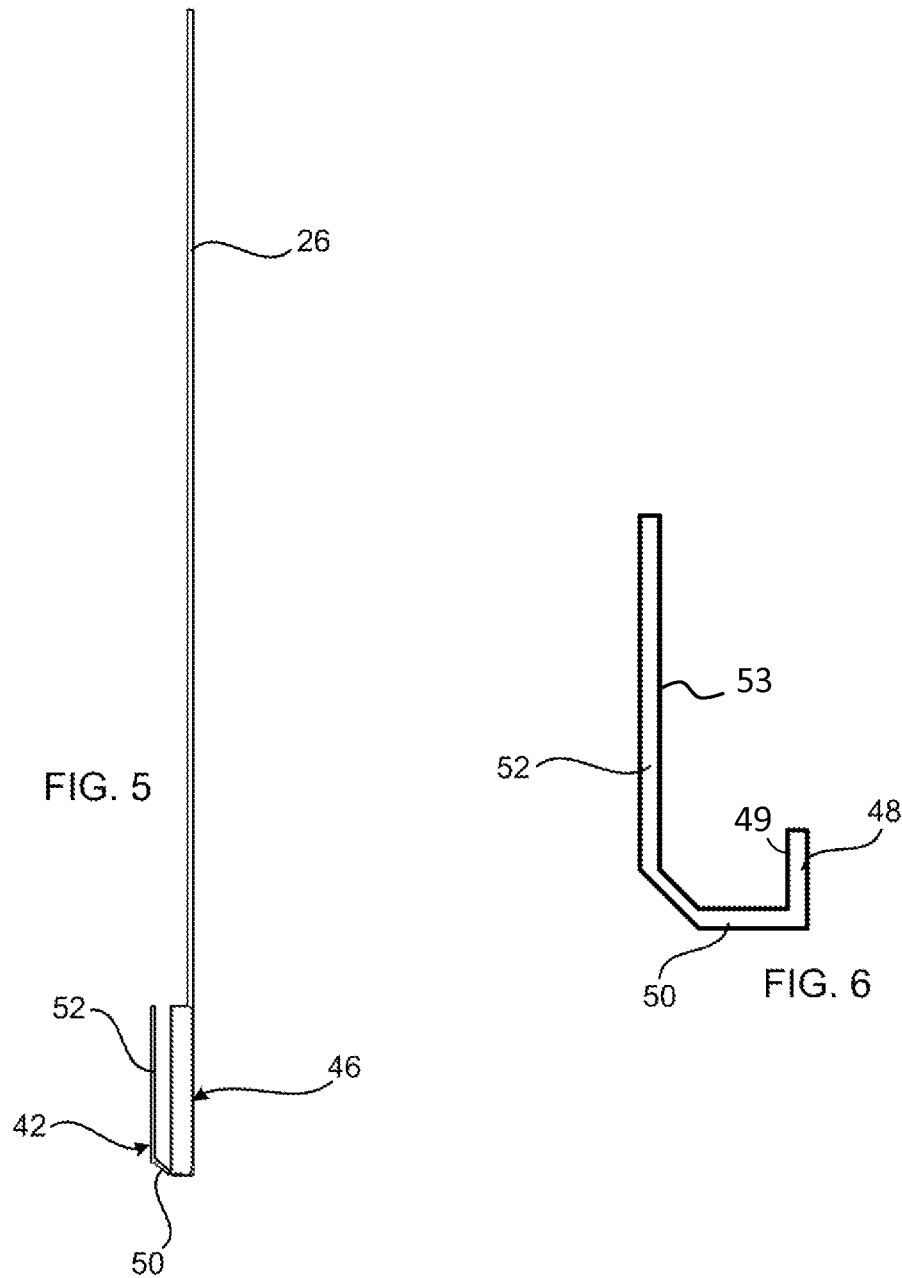

DISPLAY DEVICE WITH THERMAL LINK

BACKGROUND

A liquid crystal display, or LCD, is a display apparatus that utilizes an image display panel formed of a pair of transparent sheets of polarizing material separated by a liquid containing rod-shaped crystals. The polarizing axes of these two transparent sheets are aligned perpendicular to each other. The LCD is constructed to display an image by passing an electric current through the liquid that causes the crystals to align to block light. Each crystal can be controlled individually and essentially acts like a shutter. Current is applied to specific pixel-like areas, and those crystals align to create dark or light images. The dark areas are combined with the light areas to create text and images on the panel. The LCD panel itself does not generate light and thus requires a light source. Accordingly, the panels are back-lit or increasingly side-lit which enables very thin form factors.

One measure of the quality of a television picture is the Mura, which is a Japanese origin term for unevenness or inconsistency. In the context of televisions, and LCD televisions in particular, dark screen mura refers to the non-uniformity of the darkness of the screen. In other words, when the LCD panel receives an input directing it to prevent transmission of any light, the blackness of the screen may in fact vary, with relatively lighter or darker areas. This variability is undesirable if it is pronounced enough to be recognizable to the human eye.

BRIEF DESCRIPTION

According to one aspect of the embodiment disclosed herein, a display device includes a heat sink and an LCD panel. The LCD panel has peripheral edges and a non-activated area extending inwardly a predetermined distance from each of the peripheral edges. A thermal link made from an anisotropic graphite material is in thermal contact with the heat sink and with at least a portion of the non-activated area of the LCD panel.

According to another aspect of the embodiment disclosed herein, a thermal link is provided for a display device including an LCD panel and a heat sink. The LCD panel has a non-activated area extending around the periphery. The thermal link includes a first portion having a surface that contacts at least a portion of the non-activated area. The first portion includes a first end which contacts the non-activated area and a second end that extends outwardly from the non-activated area. The first portion is generally co-planar with the LCD panel. A second portion extends from the second end of the first portion and terminates at a third portion. The second portion is aligned generally perpendicular to the first portion surface and the third portion includes a surface that is aligned generally parallel to the first portion surface. The third portion contacts the heat sink and the first portion, second portion and third portion form a generally J-shaped cross-section and are a contiguous anisotropic graphite material.

According to yet another aspect of the embodiments disclosed herein, a display includes an LCD panel having a front and rear surface. The LCD panel includes a non-activated area at peripheral edges of the LCD panel. A thermal solution is engaged with the non-activated area of the front or rear surface along at least one of the peripheral edges. The thermal solution has a thermal resistance of less than about 25° C./W.

According to still another aspect of the embodiments disclosed herein, an LCD display device includes a structural chassis including four corners and a plurality of mounting holes. Each of the mounting holes are positioned proximate to one of the corners and are configured to receive a fastener for a wall-mount assembly. The LCD display device further includes an LCD panel secured to the structural chassis.

BRIEF DESCRIPTION OF THE DRAWINGS

FIG. 1 is a front isometric view of a display panel.
FIG. 2 is a rear isometric view of the display panel.
FIG. 5 is a side elevated view of the LCD panel and the plurality of thermal links, with the remaining display panel elements removed for clarity.
FIG. 6 is an enlarged cross-section view of a thermal link.

DETAILED DESCRIPTION

Figure 3:
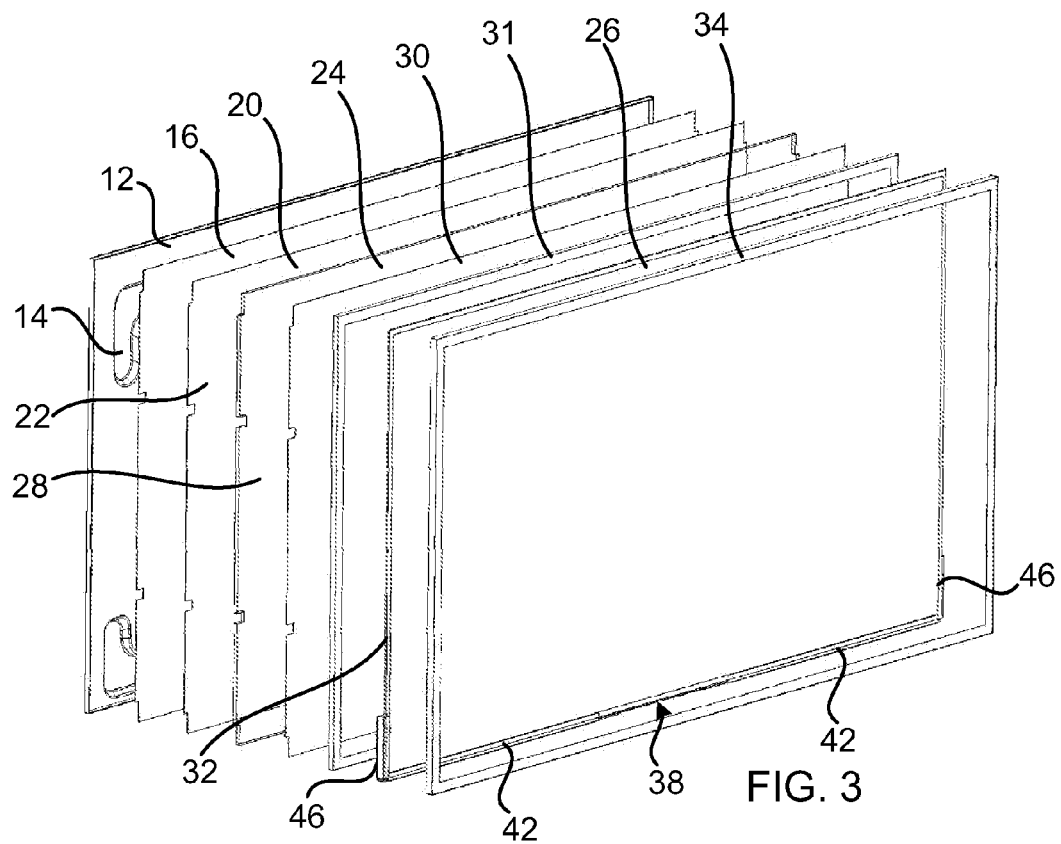
FIG. 3 is an exploded front isometric view of the display panel.

With reference now to FIGS. 1-3, an LCD device is shown and generally indicated by the numeral 10. Device 10 includes a plurality of components assembled in a stacked configuration. Though not shown, an exterior casing or housing may enclose the stacked elements discussed herein. A chassis 12 is provided at the rear of the stack and is generally configured as a rectangular sheet. Chassis 12 may include one ore more embossments 14 or raised portions that may be provided to increase the strength and/or rigidity of the chassis. Chassis 12 is typically made of a metal such as, for example, steel, aluminum or other structural materials, and consequently improves the structural integrity of the device 10, in addition to providing mounting points for display stands or wall mounts. Chassis 12 may further provide heat sink functionality as will be described in greater detail herein below.

A heat dispersion sheet 16 may be positioned forwardly of the chassis 12 in the stack and is in the form of a graphite based sheet. In one embodiment, heat dispersion sheet 16 spans substantially the entire area of the chassis 12. In this or other embodiments, heat dispersion sheet 16 is in thermal contact with substantially all of the planar surface of the chassis 12. In other embodiments the heat dispersion sheet 16 is in thermal contact with at least 75% of the planar surface of the chassis 12. In this or other embodiments, the heat dispersion sheet 16 is provided to promote even thermal distribution across the entire area of the heat dispersion sheet 16. Heat sources may include one or more circuit boards (not shown) carried on the front facing surface of the chassis 12. Other sources of heat may include one or more LED modules (not shown). In one embodiment, heat dispersion sheet 16 may be in operative thermal contact with one or more LED modules, such that heat generated by LED modules are transferred to heat dispersion sheet 16. In one embodiment, the heat dispersion sheet 16 includes one or more edge features sized and configured to directly contact the one or more LED modules.

Heat dispersion sheet 16 is advantageously an anisotropic graphite sheet material. In some embodiments the graphite material is formed of one or more sheets of compressed particles of exfoliated graphite. The compressed exfoliated graphite materials, such as graphite sheet and foil, are coherent, with good handling strength, and are suitably compressed, e.g. by roll pressing, to a thickness of about 0.05 mm to 3.75 mm and a typical density of about 0.4 to 2.0 g/cc or higher. When employed in accordance with the current disclosure, a sheet of compressed particles of exfoliated graphite should have a density of at least about 0.6 g/cc, more preferably at least about 1.1 g/cc, most preferably at least about 1.6 g/cc. The upper limit to the density of the graphite sheet heat spreader is about 2.0 g/cc. One graphite sheet suitable for use in the thermal bridge in the present disclosure is commercially available as eGRAF material, from GrafTech International Holdings Inc. of Parma, Ohio. In other embodiments, the graphite material includes one or more layers of pyrolytic graphite. By "pyrolytic graphite" is meant a graphitic material formed by the heat treatment of certain polymers as taught, for instance, in U.S. Pat. No. 5,091,025, the disclosure of which is incorporated herein by reference.

If desired, sheets of compressed particles of exfoliated graphite can be treated with resin and the absorbed resin, after curing, enhances the moisture resistance and handling strength, i.e. stiffness, of the graphite article as well as "fixing" the morphology of the article. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, fluoro-based polymers, or mixtures thereof. Suitable epoxy resin systems include those based on diglycidyl ether of bisphenol A (DGEBA) and other multifunctional resin systems; phenolic resins that can be employed include resole and novolac phenolics. Optionally, the flexible graphite may be impregnated with fibers and/or salts in addition to the resin or in place of the resin. Additionally, reactive or non-reactive additives may be employed with the resin system to modify properties (such as tack, material flow, hydrophobicity, etc.).

In certain embodiments, a plurality of graphite sheets may be laminated into a unitary article. The sheets of compressed particles of exfoliated graphite may be laminated with a suitable adhesive, such as pressure sensitive or thermally activated adhesive, therebetween. The adhesive chosen should balance bonding strength with minimizing thickness, and be capable of maintaining adequate bonding at the service temperature at which heat transfer is sought. Suitable adhesives would be known to the skilled artisan, and include acrylic and phenolic resins.

The graphite sheet(s) should have an in-plane thermal conductivity of at least about 150 W/m*K. In still other embodiments, the graphite sheet exhibits an in-plane thermal conductivity of at least about 300 W/m*K. In still other embodiments the graphite sheet exhibits an in-plane thermal conductivity of at least about 400 W/m*K. In still other embodiments the graphite sheet exhibits an in-plane thermal conductivity of at least about 700 W/m*K. In still other embodiments, the graphite sheet exhibits an in-plane thermal conductivity of at least about 1500 W/m*K. In one embodiment, the graphite sheet material may be from 10 to 1500 microns thick.

A reflector 20 is interposed forwardly of the heat dispensing element 16 in the stack. The front facing surface 22 of reflector 20 is configured to reflect light generated by the LED module(s) forwardly toward a person viewing the device 10. Reflector 20 also facilitates even distribution of the light from the LED module(s). In one embodiment, heat dispersion sheet 16 is adhered or otherwise affixed to the reflector 20. In this or other embodiments, heat dissipation material 16 is not in thermal contact with the chassis 12.

Each LED module includes one or more individual LEDs mounted on a printed circuit board. The LED modules are mounted along at least a portion of the perimeter of device 10. In one embodiment, the LED module(s) are positioned along all four peripheral edges of device 10. In other embodiments, the LED module(s) are positioned along only two peripheral edges of the device 10. In other embodiments, the LED module(s) are positioned along only one edge of the device 10. It should further be appreciated that light sources other than LEDs may be employed. For example, the light producing module may instead include one or more cold cathode fluorescent lamps.

A light-guide plate 24 is positioned adjacent to, and forwardly of reflector 20 in the stack. Light-guide plate 24 assists in directing light from the peripheral LED module to an LCD panel 26 positioned forwardly of light-guide plate 24 in the stack. Thus, light guide plate 24 includes internal optics that directs light from the LED module(s) at the peripheral edge(s) and distributes that light generally uniformly across the entire front facing surface 28 of light-guide plate 24. It should be appreciated that other lighting configurations are contemplated. For example, the LCD panel 26 may be rear lit directly by one or more LED or CCFL modules. In such an embodiment, the light-guide plate 24 may not be required.

A brightness enhancing film 30 may be positioned adjacent to, and forwardly of light-guide plate 24 in the stack. The film 30 improves the quality and uniformity of the light entering the LCD panel 26. Film 30 may itself be an assembly of a plurality of layers. For example, film 30 may include on or more diffuser layers and/or one or more lens layers.

A back-light bezel 31 is positioned forwardly of the brightness enhancing film 30 in the stack. Bezel 31 is generally open and rectangular and is provided to secure the back-light optics assembly, including the brightness enhancing film 30, light guide plate 24, and reflector plate 20, to the chassis 12. Back-light bezel 31 may be plastic or metal and may be mechanically or adhesively secured to chassis 12. Bezel 31 may include a peripheral step (not shown) or other capturing feature on the rear facing surface. This step may serve to capture the back-light optics assembly and hold it securely between bezel 31 and chassis 12. Likewise, bezel 31 may further include a peripheral step or alignment or clip feature on the forward facing surface to align or otherwise receive the LCD panel 26 therein.

The LCD panel 26 is positioned adjacent to, and forwardly of brightness-enhancing film 30 in the stack. LCD panel 26 is itself an assembly. As discussed above, panel 26 typically includes a layer of liquid crystal material sandwiched between two transparent electrodes. Opposed polarizing filters are typically positioned outwardly of each electrode layer. The liquid crystal material, electrodes, polarizing filters and further optional optical layers are carried between two transparent sheets bonded together. Commonly the transparent sheets are glass, however, other transparent optically and mechanically appropriate materials may be employed.

LCD panel 26 does not include active pixels across the entire surface area. A non-active portion 32 typically extends inwardly from the peripheral edge of the of the LCD panel 26. Non-active portion 32 may extend from the peripheral edge of LCD panel 26 inwardly from about 2 mm to about 10 mm.

An outer bezel 34 is positioned forwardly of the LCD panel 26 in the stack. Bezel 34 is generally open and rectangular and is provided to secure the LCD panel 26 to the chassis 12. Outer bezel 34 may be plastic or metal and may be adhesively but preferably mechanically secured to chassis 12. In one embodiment, a plurality of mechanical fasteners extend from bezel 34, through bezel 31 and the back-light optics assembly and are secured to chassis 12. In this manner the LCD panel 26 is securely fastened to the chassis 12. Outer bezel 34 may include a peripheral step (not shown) or other capturing feature on the rear facing surface. This step may serve to capture and/or align the LCD panel 26 and hold it securely between bezel 34 and bezel 31.

One or more circuit boards may be positioned at a plurality of locations throughout device 10. For example, circuit boards (not shown) may be secured to the forward facing surface of chassis 12. An electrical connector (not shown) connects the control and power electronics from the one or more circuit boards to the LCD panel. Typically, the electrical connector is connected to the LCD panel at the bottom edge 36 of LCD panel 26, however, it should be appreciated that the electrical connection may interface at any one or more of the peripheral edges of LCD panel 26. The control signals for the LCD panel 26 are transmitted from the circuit board(s) through the electrical connector.

The area of the LCD panel 26 proximate to the junction between panel 26 and electrical connector 38 may be an area of increased temperature relative to the remaining display area of the LCD panel 26. This increased relative temperature may be caused at least in part because all signals and power for the LCD panel 26 are channeled through this area prior to transmission across the entire area of the LCD panel 26. Another area of increased temperature is proximate to the corner edges of the LCD panel.

The temperature differentials at the corners and circuitry intersection edge relative to the rest of the panel have a negative impact on dark screen mura. To reduce the thermal differentials and improve dark screen mura of the LCD panel 26 a thermal link may be provided between a heat sink and the areas of the LCD panel 26 proximate to the edges. Given its relatively large mass and metallic makeup, the heat sink is advantageously chassis 12. The thermal link is advantageously an anisotropic graphite material as described above. The thermal link may contact the front facing or rear facing surface of the LCD panel 26 but does not extend into the viewing area of the LCD panel 26. In other words, the thermal link is advantageously only in thermal contact with the non-active or non-viewable portions 32 of the surface of the LCD panel 26.

In one embodiment, the thermal link may be adhered to the LCD panel 26 with a thermally conductive adhesive. In this or other embodiments the thermal link is held against the LCD panel by a press-fit between the LCD panel 26 and outer bezel 34. In other embodiments, the thermal link is held against press-fit between LCD panel 26 and back-light bezel 31. In one embodiment, the thermal link is in contact with the front or rear surface of the LCD panel 26 along all four edges. In other embodiments, the thermal link is in contact with the front or rear surface of the LCD panel 26 for a predetermined distance from each corner. In further embodiments the thermal link is in contact with the front or rear surface of the LCD panel 26 along three edges of the LCD panel 26 for a predetermined distance from the two corners closest to the interface with the electrical connector. In these or other embodiments, the thermal link extends from each corner at least 10% of the total length of the edge. In another embodiment, the thermal link extends at least 20% of the total length of the edge. In still other embodiments, the thermal link extends at least 30% of the total length of the edge.

According to one embodiment, the thermal link is in contact with the front or rear surface along at least 50 percent of the length of edge of the LCD panel 26 that interfaces with the electrical connector 38. According to another embodiment, the thermal link is in contact with the front or rear surface along at least 75 percent of the length of edge of the LCD panel 26 that interfaces with the electrical connector 38. According to yet another embodiment, the thermal link extends along at least 90 percent of the length of edge of the LCD panel that interfaces with the electrical connector 38.

Figure 4:
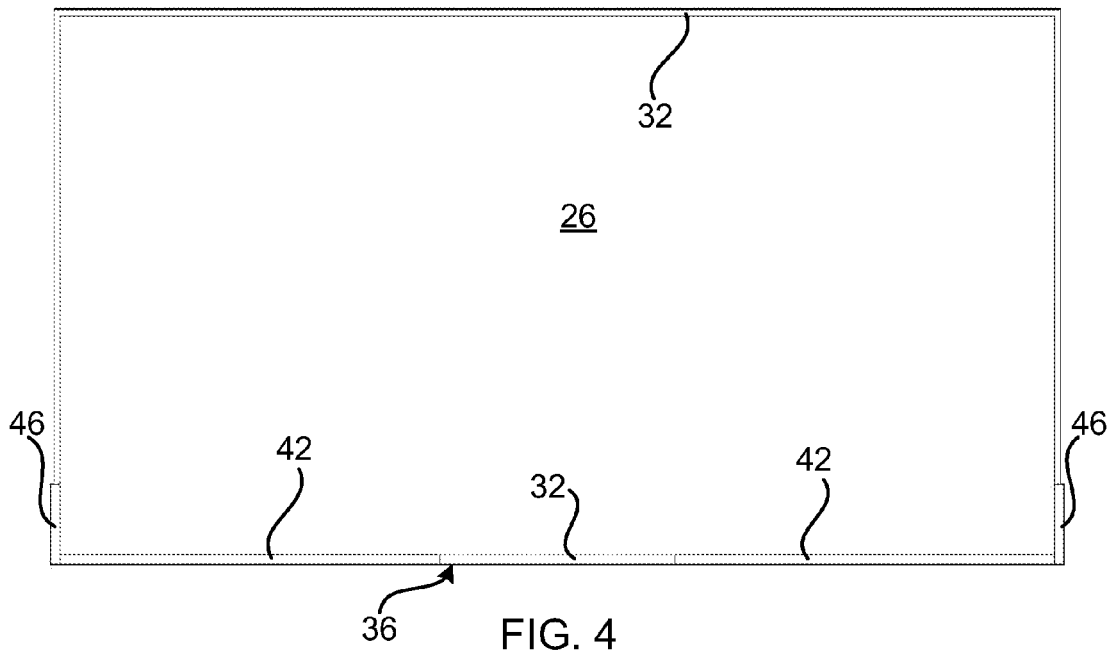
FIG. 4 is a front elevated view of the LCD panel and a plurality of thermal links.

With reference now to FIGS. 4 and 5, LCD panel 26 includes a non-activated area 32 extending around the entire peripheral edge. In one embodiment, non-activated area extends inward about 10 mm from the peripheral edge. In other embodiments, non-activated area extends inward about 8 mm from the peripheral edge. In still other embodiments, the non-activate area extends inward about 5 mm from the peripheral edge.

A pair of bottom thermal links 42 engage the front surface of the LCD panel 26 along the bottom edge 36 where the electrical connector interfaces with the LCD panel 26. As can be seen, at the areas where thermal links 42 engage the LCD panel 26, the thermal link is in thermal contact with substantially all of the non-activate portion 32. For example, if the non-activate portion extends 8 mm from the peripheral edge, the thermal link 42 engages the front surface of the LCD panel for up to 8 mm from the peripheral edge. In other embodiment's, the thermal link 42 contacts at least 50 percent of the non-activate distance from the peripheral edge. In still other embodiments, the thermal link contacts at least 75 percent of the non-activated distance from the peripheral edge. In still other embodiments, the thermal link contacts substantially all of the non-activated distance from the peripheral edge.

A further pair of thermal links 46 engage the front surface of the LCD panel 26 along each side respectively. As can be seen, thermal links 46 extend upwardly from respective bottom corners and contact substantially all of the non-activate area 32 over the length of the link 46. Links 46 may extend upwardly about 15% percent of the total length of each side peripheral edge.

With reference now to FIG. 6, which shows thermal link 42 in cross-section, each of thermal links 42 and 46 may include a generally J-shaped body, wherein a first leg also referred to as a first portion 48 includes a surface 49 which engages the front or rear surface of LCD panel 26 at non-activated areas 32 and is thus co-planar therewith. A second leg also referred to as a second portion 50 extends generally rearwardly from first portion 48 toward chassis 12. A third leg also referred to as a third portion 52 includes a surface 53 which extends generally co-planar with chassis 12, and advantageously is in thermal contact with the rear facing surface thereof. In this manner thermal energy from the peripheral edges of the LCD panel 26 are transferred to the chassis 12 which functions as a heat sink.

As discussed above, though the disclosed figures show thermal links extending along three edges of the LCD panel, it should be appreciated that thermal links may extend along as few as one edge and as many as all four edges. Further, though the disclosed figures show the thermal links extending along the front surface of the LCD panel, it should be appreciated that the thermal links may extend along the rear surface or even both surfaces concurrently.

As disclosed herein above, the removal of heat from the corners and/or edges of the LCD panel has been discovered to reduce black light mura. Accordingly, in one embodiment, a thermal solution engages at least a portion of the non-activated front or rear surface of the LCD panel 26. In one or more embodiments, the thermal solution is provided proximate to one or more corners. In this or other embodiments, the thermal solution engages the front or rear surface of the panel 26. In one embodiment, separate thermal solutions engage the LCD panel at separate locations. In one embodiment, the thermal solution is secured to the front or rear face of the non-activated portion of the LCD panel 26 for a distance extending from a corner up to a distance about one quarter the total length of the respective side. In this or other embodiments, a thermal solution is positioned proximate to all four corners of the LCD panel 26. In other embodiments the thermal solution is positioned proximate to at least two corners of the LCD panel 26.

Each thermal solution advantageously provides a thermal resistance of less than about 25° C./W, more advantageously less than about 15° C./W and still more advantageously less than about 5° C./W. The thermal solution may, according to one embodiment, advantageously be embodied by the above described thermal bridge, however, other solutions may be employed resulting in the thermal resistance performance described above. For example, graphite or metal articles having different physical configurations from the above described thermal bridge, heat sinks, thermal pastes, active cooling or any other method may be employed to achieve the thermal resistance values as described hereinabove.

Figure 7:
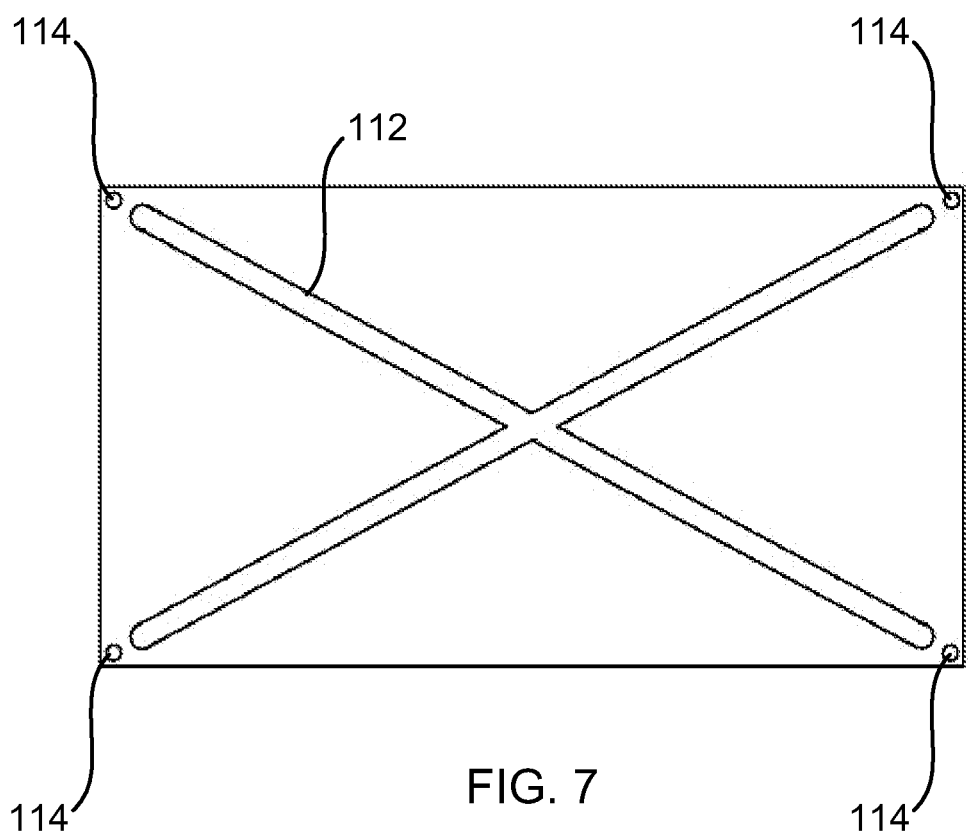
FIG. 7 is an elevated top view of an alternate chassis.

In addition to the above solutions, it has also been discovered that flexing or distortion of the chassis 12 during use may cause increased generalized dark screen mura. With reference now to FIG. 7, a modified chassis 112 is shown including an embossment 114 pattern that provides additional strength and consequentially improves dark screen mura. In one embodiment, the embossment pattern 114 is generally "X" shaped. In addition, chassis 112 includes mounting holes 114 proximate to the four corners 116 of the chassis 112. These mounting holes 114 are adapted to receive fasteners (not shown) from a wall mount or pedestal mount assembly. In one embodiment, the mounting holes 114 are each within at least 10 cm from the corners 116 of chassis 112. More advantageously, the mounting holes 114 are within about 5 cm from the corners 116 of chassis 112.

By mounting to the chassis 112 at locations proximate to the corners, instead of proximate the center of the television as is commonly done, the chassis 112 is effectively strengthened and thus flexing is reduced. This is because of the mounting locations and because the wall-mount assemblies are commonly made of high strength materials and are very rigid.

All cited patents and publications referred to in this application are incorporated by reference. The invention thus being described, it will obvious that it may be varied in many ways. Such variations are not to be regarded as a departure from the spirit and scope of the present invention and all such modifications as would be obvious to one skilled in the art are intended to be included in the scope of the following claims.

What is claimed is:

1. An LCD display device comprising:
   a heat sink comprising a metal chassis;
   an LCD panel having peripheral edges and including a non-activated area extending inwardly a predetermined distance from the peripheral edges;
   a thermal link made from an anisotropic graphite material, said thermal link in thermal contact with said heat sink and with at least a portion of said non-activated area of said LCD panel wherein the thermal link comprises:
   a first portion having a surface that contacts at least a portion of the non-activated area, said first portion including a first end and a second end extending outwardly from the non-activated area, said first portion being generally co-planar with the LCD panel,
   a second portion extending from said second end of said first portion and terminating at a third portion, said second portion being aligned generally perpendicular to said first portion surface and said third portion having a surface aligned generally parallel to said first portion surface, and
   wherein said third portion surface contacts the heat sink and wherein said first portion, said second portion and said third portion form a generally J-shaped cross-section; and
   a back-light optics assembly having a rear facing surface and a forward facing surface, said back-light optics assembly interposed between said chassis and said LCD panel, said back-light optics assembly having a heat dispersion material engaging the rear facing surface, said heat dispersion material made from an anisotropic graphite material.

2. The display device of claim 1 wherein said anisotropic graphite material comprises one or more sheets of compressed exfoliated particles of natural graphite.

3. The display device of claim 1 wherein the anisotropic graphite material comprises one or more sheets of graphitized polyamide.

4. The display device of claim 1 wherein said thermal link is adhesively secured to a rear facing surface of said chassis.

5. The display device of claim 1 wherein said LCD panel includes an input edge where an electrical connector interfaces with said LCD panel, said thermal link being in thermal contact with at least a portion of said non-activated area of said LCD panel along said input edge.

6. The display device of claim 1 wherein said LCD panel includes a front facing surface and a rear facing surface and four corners, said thermal link extends along said front or rear surface a predetermined distance from at least two corners.

7. The display device of claim 6 wherein said thermal link extends along said front or rear surface a predetermined distance from all four corners.

8. The display device of claim 1 wherein the anisotropic graphite material exhibits an in-plane thermal conductivity of at least 300 W/m-K.

9. The display device of claim 1 wherein the anisotropic graphite material exhibits and in-plane thermal conductivity of at least 700 W/m-K.

* * * * *